US010783110B2

(12) United States Patent
Ragland et al.

(10) Patent No.: US 10,783,110 B2
(45) Date of Patent: *Sep. 22, 2020

(54) PROVIDING ACCESS FROM OUTSIDE A MULTICORE PROCESSOR SOC TO INDIVIDUALLY CONFIGURE VOLTAGES

(71) Applicant: Intel Corporation, Santa Clara, CA (US)

(72) Inventors: Daniel J. Ragland, Sherwood, OR (US); Guy M. Therien, Beaverton, OR (US); Kirk Pfaender, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 16/026,691

(22) Filed: Jul. 3, 2018

(65) Prior Publication Data

US 2019/0004993 A1 Jan. 3, 2019

Related U.S. Application Data

(63) Continuation of application No. 15/007,021, filed on Jan. 26, 2016, now Pat. No. 10,013,392.

(51) Int. Cl.
*G06F 15/78* (2006.01)
*G06F 1/18* (2006.01)
(Continued)

(52) U.S. Cl.
CPC .......... *G06F 15/7807* (2013.01); *G06F 1/189* (2013.01); *G06F 1/3206* (2013.01);
(Continued)

(58) Field of Classification Search
CPC .... G06F 15/7807; G06F 1/189; G06F 1/3206; G06F 1/3243; G06F 1/3296; G06F 1/26;
(Continued)

(56) References Cited

U.S. PATENT DOCUMENTS 8,635,470 B1 1/2014 Kraipak et al.
9,116,692 B1 8/2015 Krein et al.
(Continued)

FOREIGN PATENT DOCUMENTS

WO 2009114141 A1 9/2009
WO 2012040052 A2 3/2012

OTHER PUBLICATIONS

International Search Report and Written Opinion dated Apr. 11, 2017 for International Application No. PCT/US2016/067837, 17 pages.

(Continued)

*Primary Examiner* — Ji H Bae
(74) *Attorney, Agent, or Firm* — Schwabe, Williamson & Wyatt, P.C.

(57) ABSTRACT

Apparatuses, methods and storage medium for providing access from outside a multicore processor System on Chip (SoC) are disclosed herein. In embodiments, an SoC may include a memory to store a plurality of embedded values correspondingly associated with a plurality of architecturally identical cores. Each embedded value may indicate a default voltage for a respective one of the plurality of architecturally identical cores. In embodiments, an apparatus may include one or more processors, devices, and/or circuitry to provide access from outside the multicore processor SoC to individually configure voltages of the plurality of architecturally identical cores to values that are different than the values of the default voltages. Other embodiments may be described and/or claimed.

19 Claims, 5 Drawing Sheets

(51) Int. Cl.
*G06F 1/3206* (2019.01)
*G06F 1/3234* (2019.01)
*G06F 1/3296* (2019.01)
*G06F 1/26* (2006.01)
*G06F 9/4401* (2018.01)

(52) U.S. Cl.
CPC .......... *G06F 1/3243* (2013.01); *G06F 1/3296* (2013.01); *G06F 1/26* (2013.01); *G06F 1/266* (2013.01); *G06F 9/4403* (2013.01); *G06F 9/4405* (2013.01); *Y02D 10/152* (2018.01); *Y02D 10/172* (2018.01)

(58) Field of Classification Search
CPC ...... G06F 1/266; G06F 9/4403; G06F 9/4405; Y02D 10/152; Y02D 10/172
USPC ................................ 713/1, 2, 100, 300, 310
See application file for complete search history.

(56) References Cited

U.S. PATENT DOCUMENTS

| | | |
|---|---|---|
| 10,191,532 B2 | 1/2019 | Bhandaru et al. |
| 2004/0030939 A1 | 2/2004 | Barr et al. |
| 2004/0128565 A1 | 7/2004 | Horigan |
| 2008/0244294 A1 | 10/2008 | Allarey |
| 2009/0187777 A1 | 7/2009 | Clark |
| 2010/0058078 A1 | 3/2010 | Branover et al. |
| 2010/0115300 A1 | 5/2010 | Wu et al. |
| 2010/0281278 A1 | 11/2010 | Hsiao |
| 2012/0079290 A1 | 3/2012 | Kumar et al. |
| 2012/0166764 A1 | 6/2012 | Henry et al. |
| 2012/0324250 A1 | 12/2012 | Chakraborty et al. |
| 2014/0136823 A1 | 5/2014 | Ragland et al. |
| 2015/0006915 A1 | 1/2015 | Ganesan et al. |
| 2015/0198988 A1 | 7/2015 | Dasnurkar et al. |
| 2015/0286265 A1 | 10/2015 | Gunther et al. |
| 2015/0338902 A1 | 11/2015 | Mittal et al. |
| 2016/0054788 A1 | 2/2016 | Gulati et al. |

OTHER PUBLICATIONS

Non-Final Office Action dated Apr. 3, 2017 for U.S. Appl. No. 15/007,021, 17 pages.

Final Office Action dated Oct. 17, 2017 for U.S. Appl. No. 15/007,021, 15 pages.

Notice of Allowance dated Mar. 7, 2018 for U.S. Appl. No. 15/007,021, 6 pages.

Office Action dated Jan. 3, 2020 for SG Application No. 10201610418V, 9 pages.

PROVIDING ACCESS FROM OUTSIDE A MULTICORE PROCESSOR SOC TO INDIVIDUALLY CONFIGURE VOLTAGES

CROSS REFERENCE TO RELATED APPLICATION

This application is a continuation of U.S. patent application Ser. No. 15/007,021, entitled "PROVIDING ACCESS FROM OUTSIDE A MULTICORE PROCESSOR SOC TO INDIVIDUALLY CONFIGURE VOLTAGES," filed on Jan. 26, 2016, now U.S. Pat. No. 10,013,392, and claims priority to the application Ser. No. 15/007,021. The entire disclosure of the application Ser. No. 15/007,021 is incorporated herein by reference.

TECHNICAL FIELD

The present disclosure relates to multicore processors, for example multicore processors of a System on Chip (SoC) architecture, and more specifically relates to access from outside a multicore processor to individually configure voltages of the processor cores.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In order to manage manufacturing variation during fabrication of multicore processors while maintaining quality and reliability, conservative guard bands are employed during testing, and devices are "binned" or classified based on their speed and power characteristics. Conventional speed binning treats multicore processors as single-core devices by assigning a single related speed and minimum operating voltage for the processor as a whole. The rated speed and minimum voltage typically reflects the speed of the slowest core and the minimum voltage of the core having the poorest minimum voltage.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
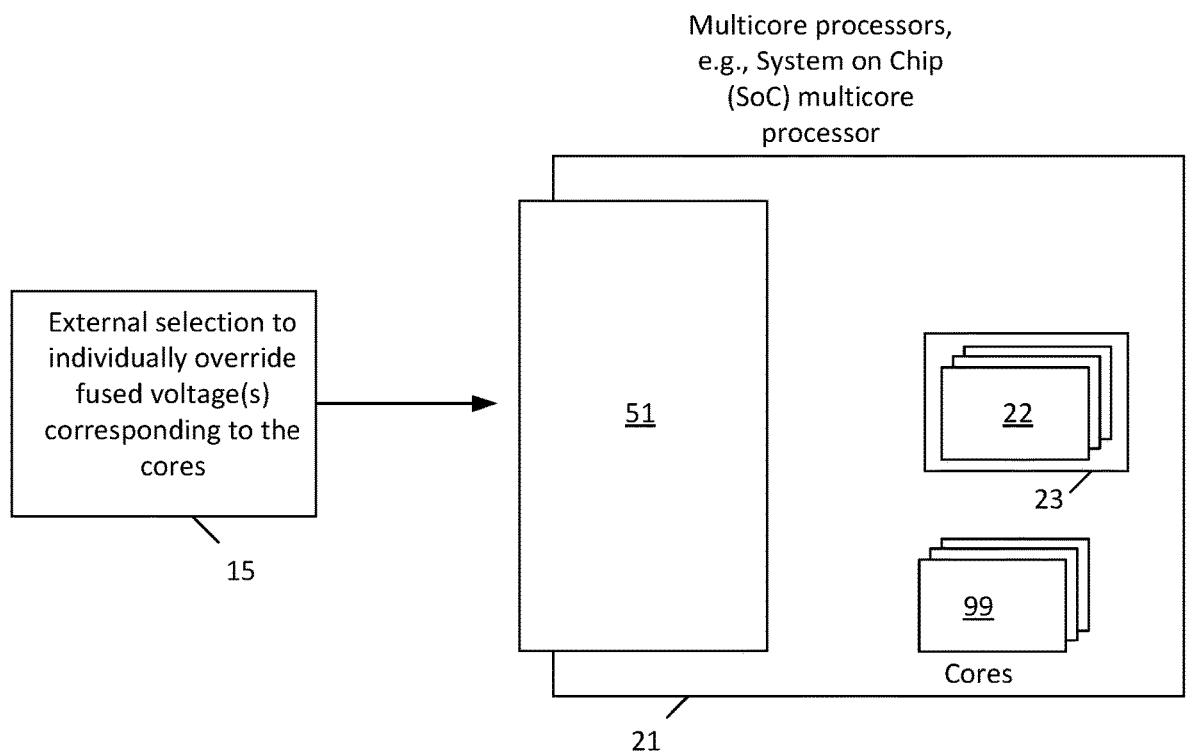
FIG. 1 illustrates an example system having access from outside a multicore processor to individually configure voltages of the processor cores, according to various embodiments.

Apparatuses, methods and storage medium associated with computing that includes providing access from outside a multicore processor SoC to individually configure voltages of the processor cores are disclosed herein. In embodiments, an apparatus may include one or more processors, devices, and/or circuitry to provide access from outside the multicore processor SoC to individually configure voltages of the plurality of architecturally identical cores to values that are different than the values of the default voltages.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In known multicore processor SoCs, for a variety of reasons, such as manufacturing variations, all processor cores (hereinafter, simply "cores") are not created equal. While the cores may be logically identical (e.g., architecturally identical), the cores may have different physical characteristics. One core of a multicore processor SoC may be capable of operating at a higher performance level, e.g., higher frequency or lower voltage, than another core of the multicore processor SoC.

In some processors, at manufacturing time, different voltages, which may be called "manufacturing fused voltages" may be associated with the different cores, reflective of their different operating capability. The manufacturing fused voltages may configure a fixed maximum voltage for each core. The manufacturing fused voltages may be stored in read only memory of the multicore processor.

Performance modification tools, sometimes referred to as "overclocking" tools, may provide voltage configurability. In known performance modification tools, an operating system interface or a Basic Input Output System (BIOS) interface may communicate with a Processor Control Unit (PCU) to enable a system administrator to select an operating voltage that is different than at least some of the fused voltages of the multicore processor, by a signal to the PCU. For instance, an example six-core multicore processor that is capable of operating at 1.55V (to achieve a higher frequency and/or performance level) may include a read only memory storing the voltages 1.3V, 1.35V, 1.55V, 1.35V, 1.35V, and 1.3V for core 0, core 1, core 2, core 3, core 4, and core 5, respectively. A system administrator may, accepting the associated tradeoffs, configure the multicore processor for 1.55V operation with known performance modification tools, to attempt to operate the cores at voltages 1.55V, 1.55V, 1.55V, 1.55V, 1.55V, and 1.55V for core 0, core 1, core 2, core 3, core 4, and core 5, respectively. If the computing system using the multicore processor appears to be stable at administered multicore processor setting (e.g. 1.55V in the above example), certain tradeoffs are still realized (despite the apparent stability). These tradeoffs may include accelerated reliability degradation and thermal considerations. The higher the voltage, the shorter the life of a given processor core will be. All processor cores are subjected to accelerated degradation because they all run at the voltage required by the "weakest" core. The administered multicore processor setting will also result in higher processor package temperatures. This could result in throttling (lower performance) and/or may require more aggressive, such as more expensive, cooling solution.

Various embodiments disclosed herein enable the ability to externally configure voltage of each core of a multicore processor with an SoC architecture, which may be used to improve performance, power efficiency, reliability, or the like, or combinations thereof. In an example, a system may support user/system/software programmability of processor core voltage for each processor core. In an example, the system may support individual processor core voltages above a respective fixed voltage maximum voltage of the manufacturing fused voltages of the multicore processor.

Various embodiments may include an externally configurable interface for per core voltage settings (e.g., access from outside the multicore processor SoC to individually configure voltages to values that are different than the values of manufacturing fused voltages). In an example, a processor interface, accessible to BIOS or other software (e.g., an operating system, driver, application, etc.), may enable configuration of voltage on a per individual core basis. In an example, the interface may utilize register(s), such as control register(s) (e.g., an MSR (model specific register(s))), a messaging interface, such as OC (overclocking) Mailbox, or the like, or combinations thereof. The interface may provide more than one format in which external configuration may be managed, e.g. actual voltage value per processor core, an offset from the a default such as the manufacturing fused voltages, a single voltage value and an offset from the single voltage value, or the like, or combinations thereof.

Various embodiments may include an automated system, which may be internal to the processor. In an example, the automated system may include a PCU to scale and/or select voltage values for individual processor cores based on information received from the externally configurable interface, such as based on an externally requested frequency (e.g., a user-selected frequency or a frequency selected by an external system such as an application of an operating system associated with the multicore processor). The automated system may receive an external configuration input including and/or indicating a request for individualized voltage mode. The request may be from BIOS, other software (such as an operating system), a register (such as a control register), a messaging interface, or the like, or combinations thereof. The PCU may generate an estimate of how to scale an operation characteristic, e.g., scaling up voltage, and then apply the PCU generated estimate responsive to receiving the request.

Various embodiments may include a multicore processor, e.g., a multicore processor of an SoC architecture, of a computing system. The multicore processor may include an interface exposed to the computing system, the exposed interface to accept and implement voltage values requested by the computing system. The computing system may include software code (of BIOS, an application, an operating system, etc.) to communicate with the exposed interface to program the multicore processor with the voltage values.

Various embodiments may improve performance and/or reliability. The increased performance may be associated with a lower individual voltage for at least one core, which may create less heat. The lower heat may result in a higher "overclock" to another core, which may provide improved computing performance. The lower heat may result in improved performance of automated turbo operation systems. The improved reliability may be based on reduction of the average voltage per core.

FIG. 1 illustrates an example system having access from outside a multicore processor to individually configure voltages, according to various embodiments.

The system 100 may include a multicore processor 21, e.g., an SoC multicore processor. The multicore processor 21 may include a plurality of cores 99, e.g. a plurality of architecturally identical cores. A first core of the plurality of cores 99 may have a first physical characteristic, and a second core of the plurality 99 may have a second physical characteristic that is different than the first physical characteristic. The different physical characteristics may be related to process, heat, or temperature variations during manufacturing, the different relative positions of the cores of the plurality 99 in the multicore processor 21, or the like, or combinations thereof.

The multicore processor 21 may include a memory 23 storing a plurality of embedded values 22 correspondingly associated with the plurality of cores 99, each embedded value to indicate a default voltage for a respective one of the plurality of cores 99.

A component 51 may provide access from outside the multicore processor 21 to individually set/program voltages of the plurality of cores 21 to values that are different than the embedded values 22. The component 51 may receive an external selection 15 to individually override at least one of the embedded values 22, e.g., to override at least a subset of the values 22 and/or to override one of the values 22 differently than another one of the values. The external selection 15 may be from BIOS or other software (an application, an operating system) of a computing system in which the multicore processor 21 is resides. In various embodiments, the component 51 may include a register-based interface, a message-based interface, an instruction-based interface, pins, or the like, or combinations thereof.

In an example where the multicore processor 21 utilizes a discrete voltage regulator that provides voltage to the multicore processor 21. The discrete voltage regulator may be an external voltage regulator. In such a case the component 21 may include pins (e.g. input pins) that couple the multicore processor 21 to each voltage regulator of multiple individual voltage regulators or multiple individual voltage regulator components of the external voltage regulator. The external voltage regulator may be controlled by circuitry (e.g., the PCU) of the multicore processor 21 to provide, over the pins, voltages at least one of which is different than the manufacturing fused voltages. The component 21 may also include the controlling circuitry, such as a PCU and code, such as microcode and/or pcode, to determine a voltage regulator setting for the external voltage regulator.

Figure 2:
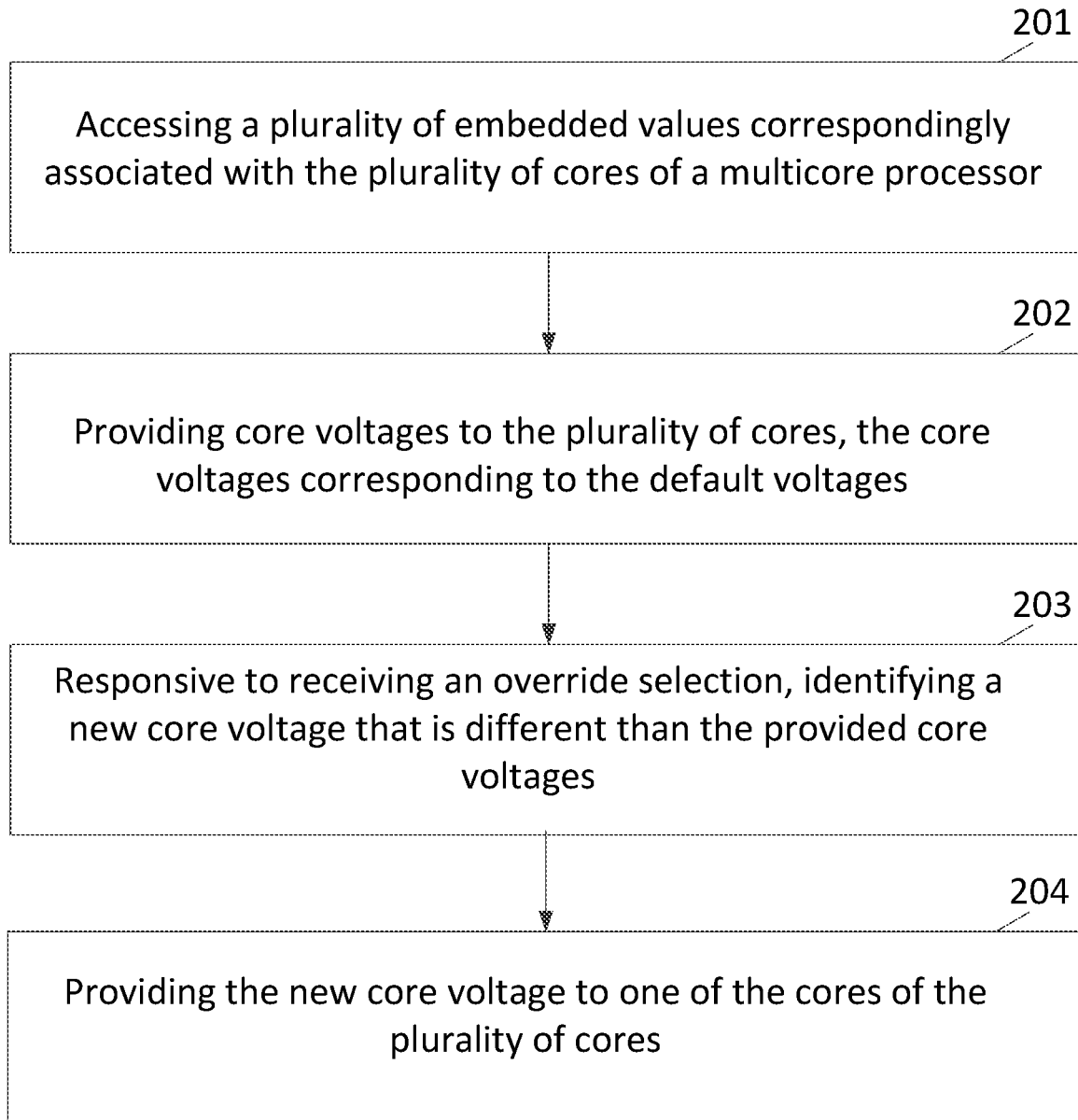
FIG. 2 illustrates example operations that may be performed by the system of FIG. 1, according to various embodiments.

FIG. 2 illustrates example operations that may be performed by the system of FIG. 1, according to various embodiments.

In block 201, the system 100 may access a plurality of embedded values correspondingly associated with a plurality of cores of the multicore processor 21. The access may occur at a first time.

In block 202, the system 100 may provide the core voltages to the plurality of cores. The core voltages may correspond to the default voltages. The system 100 may provide the core voltages by a control processor to read the plurality of embedded values and signal an integrated voltage regulator, such as a Fully Integrated Voltage Regulator (FIVR) to provide the core voltages. In another example, the system 100 may provide the core voltages by a component, such as BIOS, to allow an external voltage regulator to provide the core voltages.

In block 203, the system 100 may identify a new core voltage that is different than a corresponding one of the provided core voltages responsive to receiving an override selection. The override selection may be a manually determined override selection (by a system administrator), or otherwise determined override selection, for instance by software such as a tuning application, BIOS, an operating system, or the like, or combinations thereof.

In block 204, the system 100 may provide the new core voltage to a corresponding one of the cores of the plurality of cores. The system 100 may provide the new core voltage at a second time that is later than the first time.

Figure 3:
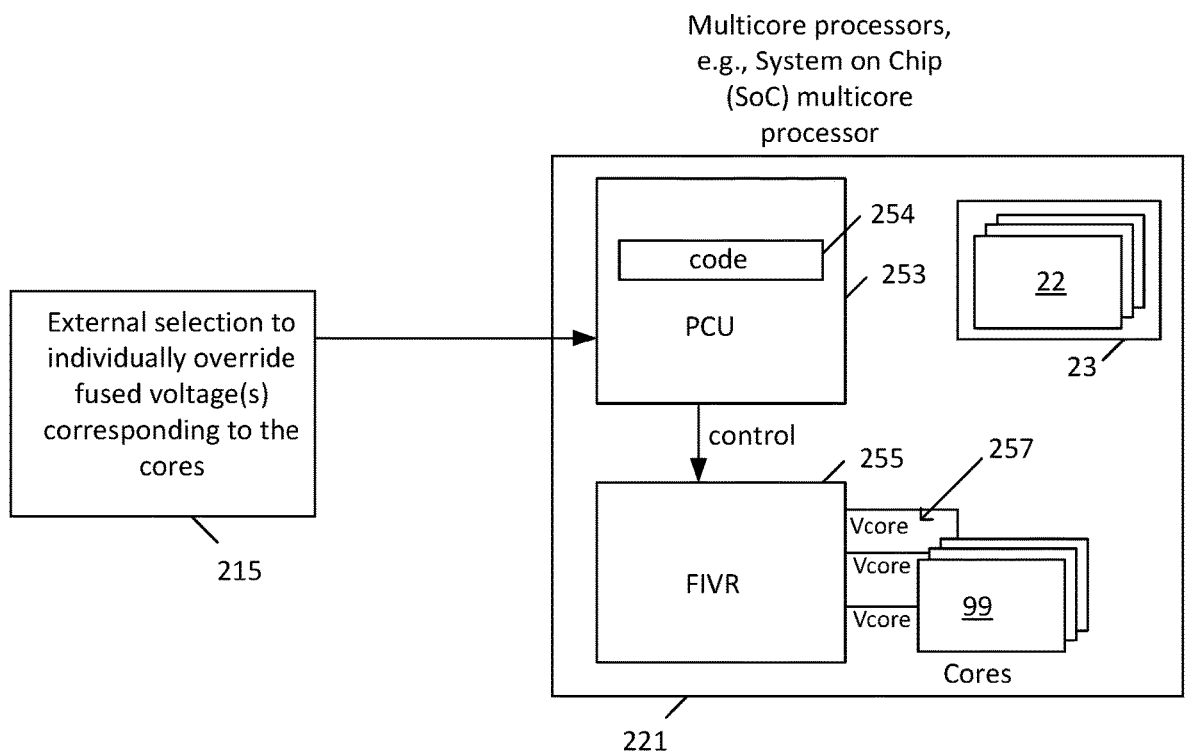
FIG. 3 illustrates an example of a system that may include a Processor Control Unit (PCU) and an integrated voltage regulator, according to various embodiments.

FIG. 3 illustrates an example of a system that may include a PCU 253 and an integrated voltage regulator (FIVR 255), according to various embodiments. In the system 200, the multicore processor 21 may include code 254, e.g., microcode and/or pcode) of a PCU 253 to control the FIVR 255 of the multicore processor 21.

The code 254 may recognize an external selection 215 to individually override fused voltage(s) corresponding to the cores 99. In an example, the code 215 may utilize a protocol of a messaging interface or other interface to recognize the external selection 215.

The code 254 may be control the FIVR 255 to cause the FIVR 255 to provide Vcores 257 to the cores 99 responsive to receiving the external selection 215. For example if the FIVR 255 is already providing a voltage corresponding to a respective one of a plurality of embedded values 22 of a memory 23, the FIVR 255 may change at least one of the provided voltages based on the control from the PCU 253.

The respective core(s) of the cores 99 may receive the new core voltage that is different than the previously provided voltage.

Figure 4:
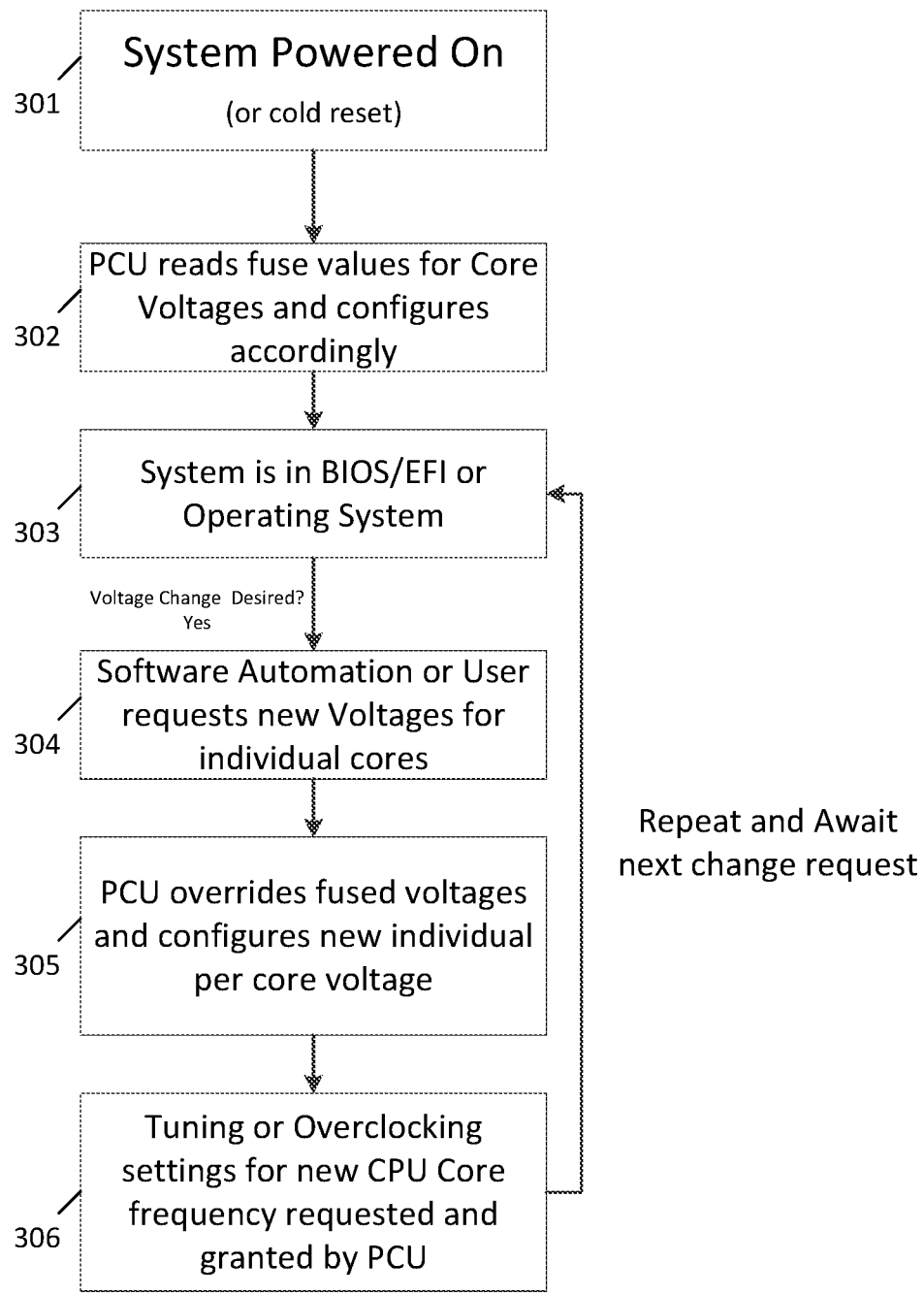
FIG. 4 illustrates example an example process that may be used in the example system of FIG. 3, according to various embodiments.

FIG. 4 illustrates example an example process that may be used in the example system of FIG. 3, according to various embodiments.

In block 301, the system 200 may be powered on (or cold reset). In block 302, the PCU 253 may read fuse values 22 for the core voltages of the memory 23 and may configure accordingly.

In block 303, the system 200 may be operating via BIOS/EFI (extensive firmware interface) or an operating system. In block 304, a software automation or a system administer may determine a new voltage for at least one individual core. The code 254 may recognize a request for the new voltage using the protocol.

In block 305, the system 200 may override the corresponding fused voltage(s), e.g., the PCU 253 may control the FIVR 255 to cause the new core voltage(s) to be provided to the appropriate one(s) of the cores 99. In block 306, the system 200 may output an indication to BIOS, an application, and/or the operating system, that the modification setting (e.g., a tuning or overclocking setting for the new core voltage) was granted, e.g., granted by the PCU 253. The process may be partially repeated (the control processor of the multicore processor may poll for a next request) as shown by the return arrow for a next new voltage (also may be determined by a software automation or a system administer).

In an example, a six-core multicore processor that is capable of operating two of its cores at higher frequencies with 1.40V, may include a read only memory storing the voltages 1.3V, 1.35V, 1.25V, 1.35V, 1.35V, and 1.25V for core 0, core 1, core 2, core 3, core 4, and core 5, respectively, is provided. A system administrator may, accepting the associated tradeoffs, configure these two cores at 1.40V operation, to attempt to operate the cores at voltages 1.3V, 1.35V, 1.40V, 1.35V, 1.35V, and 1.40V for core 0, core 1, core 2, core 3, core 4, and core 5, respectively. As such, cores 2 and 5 may be configured to a higher frequency without the need of changing the voltage of other cores.

Figure 5:
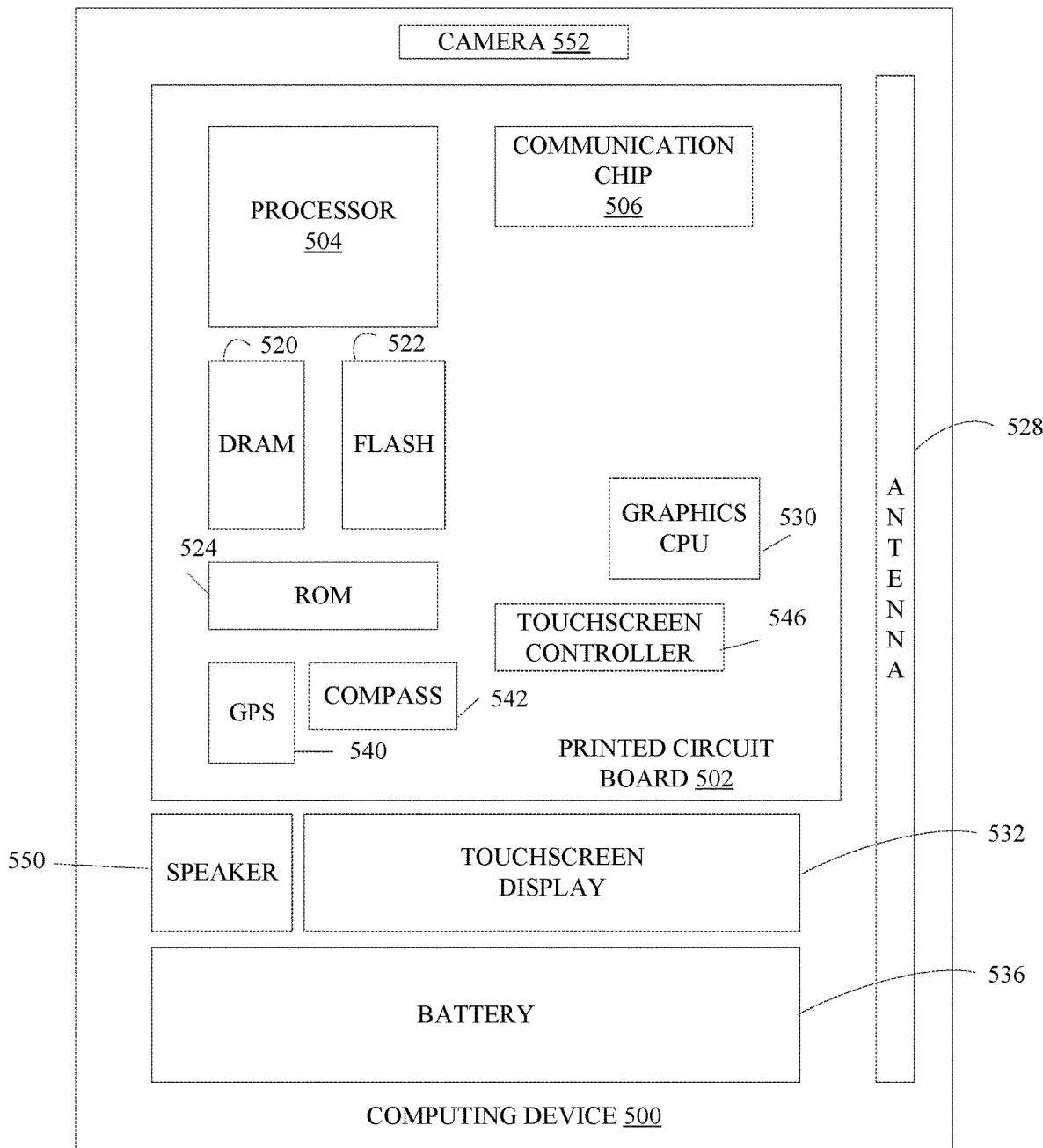
FIG. 5 illustrates an example computing device that may employ the apparatuses and/or methods described herein, according to various embodiments.

FIG. 5 illustrates an example computing device that may employ the apparatuses and/or methods described herein, according to various embodiments.

Example computing device 500 may employ the apparatuses and/or methods described herein, in accordance with various embodiments. As shown, computing device 500 may include a number of components, such as one or more processor(s) 504 (one shown) and at least one communication chip 506.

In various embodiments, the one or more processor(s) 504 each may include one or more processor cores. At least one of the one or more processor(s) 504 may be a multicore processor SoC of FIG. 1 or 3. In various embodiments, the at least one communication chip 506 may be physically and electrically coupled to the one or more processor(s) 504. In further implementations, the communication chip 506 may be part of the one or more processor(s) 504. In various embodiments, computing device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, a memory controller (not shown), volatile memory (e.g., dynamic random access memory (DRAM) 520), non-volatile memory such as read only memory (ROM) 524, flash memory 522, an I/O controller (not shown), a digital signal processor (not shown), a crypto processor (not shown), a graphics processor 530, one or more antenna 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or a storage device (not shown) may include associated firmware (not shown) storing programming instructions configured to enable computing device 500, in response to execution of the programming instructions by one or more processor(s) 504, to practice all or selected aspects of the methods described herein. For example, the programming instructions may implement the earlier control processor, e.g., PCU, with references to the respective ones of FIGS. 1-4. In various embodiments, these aspects may additionally or alternatively be implemented using hardware separate from the one or more processor(s) 504, flash memory 512, or storage device 511. For example, the alternate hardware may include the earlier described control processor equipped with code, e.g., microcode and/or pcode, to perform the operations earlier described with references to the respective ones of FIGS. 1-4.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 500 may be any other electronic device that processes data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples

Example 1 is an apparatus with per-core voltage adjustability. The apparatus may include a multicore processor SoC (system-on-chip) including: a plurality of architecturally identical cores, wherein a first core of the plurality of architecturally identical cores has a first physical characteristic and a second core of the plurality of architecturally identical cores has a second physical characteristic that is different than the first physical characteristic; and a memory to store a plurality of embedded values correspondingly associated with the plurality of architecturally identical cores, each embedded value to indicate a default voltage for a respective one of the plurality of architecturally identical cores; and a component to provide access from outside the multicore processor SoC to individually set voltages of the plurality of architecturally identical cores to values that are different than the values of the default voltages.

Example 2 includes the subject matter of example 1, and the multicore processor SoC further includes: a voltage regulator coupled to the plurality of architecturally identical cores, the voltage regulator to provide the individually set voltages to the plurality of architecturally identical cores.

Example 3 includes the subject matter of any of examples 1-2, and further comprises an external voltage regulator coupled to the multicore processor SoC.

Example 4 includes the subject matter of any of examples 1-3, and the component includes a plurality of pins each corresponding to a respective core of the plurality of architecturally identical cores.

Example 5 includes the subject matter of any of examples 1-4, and the multicore processor SoC further includes: a power control unit (PCU); and memory having instructions stored thereon that, in response to execution by the PCU, the PCU to perform operations, to: recognize information of a signal received by the multicore processor SoC via the component; and control a voltage regulator of the multicore processor SoC based on the information of the recognition to cause the voltage regulator to provide a first voltage to a first core of the plurality of architecturally identical cores responsive to the recognition of the information, wherein a magnitude of the first voltage is different than a magnitude of a corresponding one of the default voltages.

Example 6 includes the subject matter of any of examples 1-5, and the information of the recognition includes at least one of an actual voltage value corresponding to respective one of the cores, an offset from a respective one of the default voltages, or a voltage value and an offset from the base voltage value.

Example 7 includes the subject matter of any of examples 1-6, and further comprises a module to facilitate a user to access the component to individually set voltages of the plurality of architecturally identical cores to values that are different than the values of the default voltages.

Example 8 includes the subject matter of any of examples 1-7, and the module is to message the interface in response to inputs from the user.

Example 9 includes the subject matter of any of examples 1-8, wherein the component includes a control register.

Example 10 includes the subject matter of any of examples 1-10, and further comprises a Basic Input Output System (BIOS) to facilitate a user to access the component to individually set voltages of the plurality of architecturally identical cores to values that are different than the values of the default voltages.

Example 11 is a computer-readable medium having instructions of per-core processor programming stored thereon that, in response to execution by a processing device, cause the processing device to perform operations, to: recognize information of a signal received by a multicore processor SoC (system on chip); wherein a first core of the multicore processor SoC has a first physical characteristic and a second core of the multicore processor SoC has a second physical characteristic that is different than the first physical characteristic; and control a voltage regulator of the multicore processor SoC based on the information of the recognition to cause the voltage regulator to selectively provide a first voltage to a first core of the plurality of cores.

Example 12 includes the subject matter of example 11, wherein the operations are further to selectively provide a second voltage to a second core of the plurality of cores, said selective providing of the second voltage to the second core to be contemporaneous with the selective providing of the first voltage to the first core.

Example 13 includes the subject matter of any of examples 11-12, wherein the second voltage is a default voltage corresponding to said second core.

Example 14 includes the subject matter of any of examples 11-13, wherein: the information of the recognition includes at least one of an actual voltage value corresponding to respective one of the cores, an offset from a respective one of a default voltage corresponding to the first core, or a base voltage value and an offset from the base voltage value; and the first voltage corresponds to at least one of the actual voltage value, the offset from the respective one of the default voltages, or the offset from the base voltage value.

Example 15 is a method for programming a processor voltage on a per-core basis. The method may include accessing a plurality of embedded values correspondingly associated with the plurality of cores of a multicore processor, each embedded value indicating a default voltage for a respective one of the plurality of architecturally identical cores; at a first time, providing core voltages to the plurality of cores, the core voltages corresponding to the default voltages; responsive to receiving an override selection, identifying a new core voltage that is different than the provided core voltages; and at a second time that is later than the first time, providing the new core voltage to one of the cores of the plurality of cores.

Example 16 includes the subject matter of example 15, and at the second time, providing a core voltage of the core voltages to a different one of the cores of the plurality of cores.

Example 17 includes the subject matter of any of examples 15-16, and at the second time, providing a different new core voltage to a different one of the cores of the plurality of cores.

Example 18 includes the subject matter of any of examples 15-17, and the override selection includes an overvolt command.

Example 19 includes the subject matter of any of examples 15-17, and wherein the override selection includes an undervolt command.

Example 20 includes the subject matter of any of examples 15-19, and the override selection indicates a voltage range, and wherein the method further comprises: selecting the new core voltage from the voltage range.

Example 21 is an apparatus to program a processor voltage on a per-core basis. The apparatus may include means for accessing a plurality of embedded values correspondingly associated with the plurality of cores of a multicore processor, each embedded value indicating a default voltage for a respective one of the plurality of architecturally identical cores; means for providing core voltages to the plurality of cores at a first time, the core voltages corresponding to the default voltages; means for identifying a new core voltage that is different than the provided core voltages responsive to receiving an override selection; and means for providing the new core voltage to one of the cores of the plurality of cores at a second time that is later than the first time.

Example 22 includes the subject matter of example 21, and means for providing a core voltage of the core voltages to a different one of the cores of the plurality of cores at the second time.

Example 23 includes the subject matter of any of examples 21-22, and means for providing a different new core voltage to a different one of the cores of the plurality of cores at the second time.

Example 24 includes the subject matter of any of examples 21-23, and the override selection includes an overvolt command.

Example 25 includes the subject matter of any of examples 21-23, and the override selection includes an undervolt command.

Example 26 includes the subject matter of any of examples 21-25, and the override selection indicates a voltage range, and the apparatus may include means for selecting the new core voltage from the voltage range.

What is claimed is:

1. An apparatus, comprising:
    a processor SoC (system-on-chip) including:
        an integrated voltage regulator to regulate one or more cores of the processor SoC;
        circuitry to control the integrated voltage regulator;
        a communication interface to provide access from outside the processor SoC based on a message interface protocol;
        a memory that stores one or more embedded values correspondingly associated with the one or more cores, each embedded value to indicate a default voltage for a respective one of the one or more cores; and
        the circuitry further to:
            recognize, based on the message interface protocol, a value from a signal received over the communication interface, wherein the signal comprises a voltage request generated outside the processor SoC to individually set a voltage of a core of the one or more cores differently than a corresponding one of the one or more default voltages;
            control the integrated voltage regulator responsive to the value recognized based on the message interface protocol to individually set the voltage of the core differently than the corresponding one of the one or more default voltages.

2. The apparatus of claim 1, wherein the integrated voltage regulator comprises a FIVR (Fully Integrated Voltage Regulator).

3. The apparatus of claim 1, wherein the circuitry comprises a processor to execute data or stored microcode.

4. The apparatus of claim 3, wherein the data comprises Pcode.

5. The apparatus of claim 1, wherein a magnitude of the voltage of the core is different than a magnitude of the corresponding one of the one or more default voltages.

6. The apparatus of claim 5, wherein the value recognized based on the message interface protocol includes at least one of an actual voltage value, an offset from the corresponding one of the default voltages, or a base voltage value and an offset from the base voltage value.

7. The apparatus of claim 1, wherein the value recognized based on the message interface protocol comprises a user selected value.

8. The apparatus of claim 1, wherein the signal is from an OC (overclocking) Mailbox.

9. The apparatus of claim 1, wherein the signal comprises information stored in a control register.

10. The apparatus of claim 1, further comprising a Basic Input Output System (BIOS) to facilitate a user to generate the voltage request.

11. A non-transitory computer-readable medium having instructions stored thereon that, in response to execution by a processor of a processor SoC (system-on-chip) having an integrated voltage regulator and an externally configurable interface, cause the processor to perform operations, to:
    recognize, based on a message interface protocol, a value from a signal received over the externally configurable interface, wherein the signal comprises a voltage request generated outside the processor SoC to individually set a voltage of a core of one or more cores of the processor SoC differently than a default voltage for the core; and
    control the integrated voltage regulator responsive to the value recognized based on the message interface protocol to individually set the voltage of the core differently than the default voltage.

12. The non-transitory computer-readable medium of claim 11, wherein a magnitude of the voltage of the core is different than a magnitude of the default voltage.

13. The non-transitory computer-readable medium of claim 11, wherein the value recognized based on the message interface protocol includes at least one of an actual voltage value, an offset from the default voltage, or a base voltage value and an offset from the base voltage value.

14. The non-transitory computer-readable medium of claim 11, wherein the value recognized based on the message interface protocol comprises a user selected value.

15. The non-transitory computer-readable medium of claim 11, wherein the signal is from an OC (overclocking) Mailbox.

16. A method of operating a processor system-on-chip (SoC) having an integrated voltage regulator and an externally configurable interface, the method comprising:
    identifying a message interface protocol to interpret voltage requests generated externally from the processor SoC to individually set voltages of one or more cores of the processor SoC to values that are different than one or more values of default voltages correspondingly associated with the one or more cores of the processor SoC;
    recognizing based on the message interface protocol, a value from a signal received over the externally configurable interface, wherein the signal includes one of the voltage requests;
    controlling the integrated voltage regulator responsive to the value recognized based on the message interface protocol to individually set one of the voltages differently than a corresponding one of the default voltages.

17. The method of claim 16, wherein a magnitude of the voltage that is individually set differently than the corresponding one of the default voltages is different than a magnitude of the corresponding one of the default voltages.

18. The method of claim 16, wherein the value recognized based on the message interface protocol includes at least one of an actual voltage value, an offset from the corresponding one of the default voltages, or a base voltage value and an offset from the base voltage value.

19. The method of claim 16, wherein the value recognized based on the message interface protocol comprises a user selected value.

* * * * *